March 2, 1971 — D. BORELLO — 3,566,714
BATTERY-POWERED MOTOR ARRANGEMENT
Filed June 20, 1969
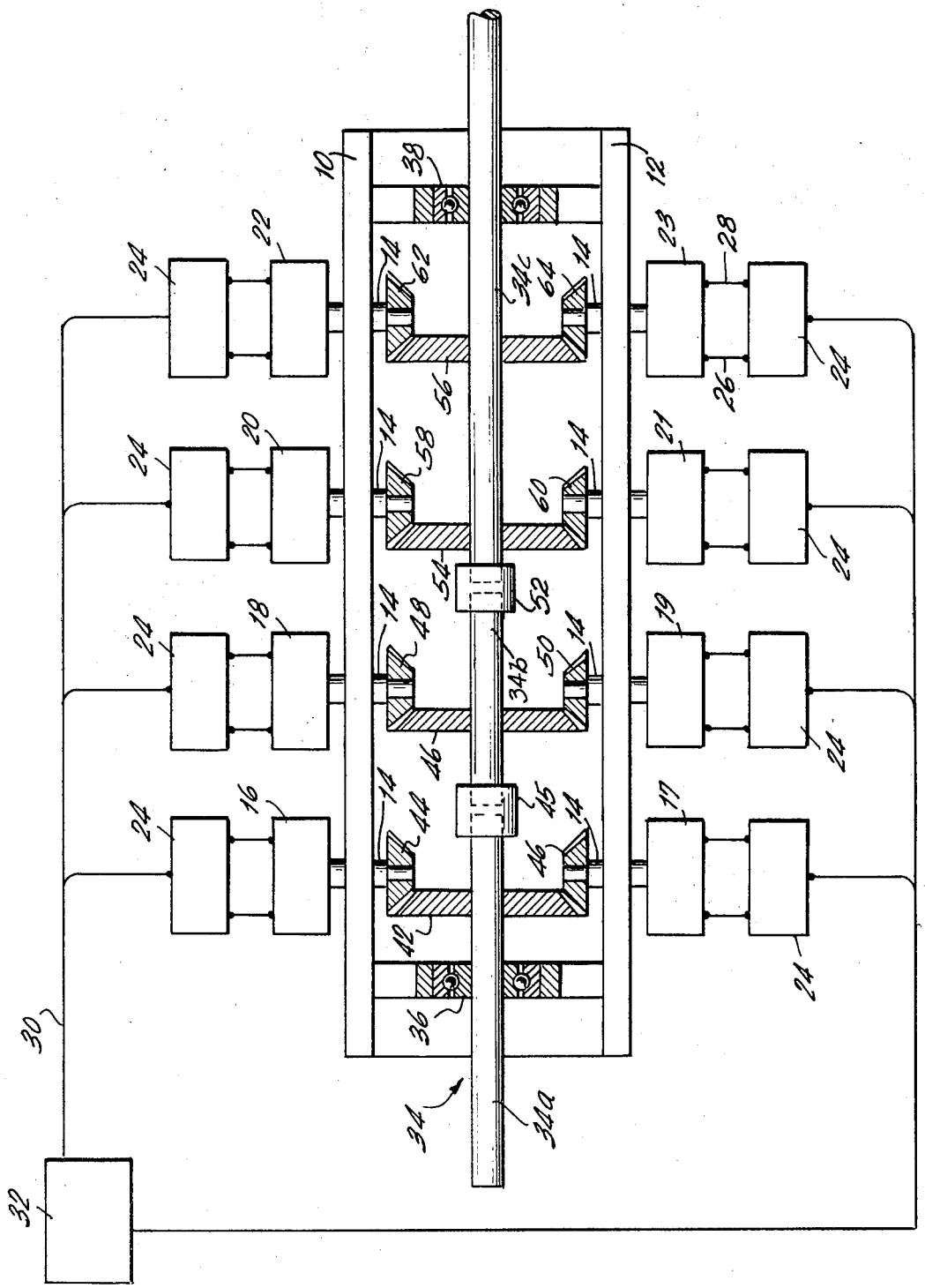
INVENTOR.
Domenic Borello
BY
Myron Amer
ATTORNEY 3,566,714
BATTERY-POWERED MOTOR ARRANGEMENT
Domenic Borello, 142 Nyac Ave., Pelham, N.Y. 10803
Filed June 20, 1969, Ser. No. 835,167
Int. Cl. F16h 37/06, 1/20
U.S. Cl. 74—661                                4 Claims

ABSTRACT OF THE DISCLOSURE

A motor arrangement for a car or other such vehicle which is characterized by the use of a plurality of motors, rather than a single motor, each of the motors being readily energized by a commercially available battery of a comparatively small voltage capacity rather than a single, specially built high voltage battery. The use of plural motors additionally enables the use of intermeshing gears of selective tooth ratios to progressively bring the power shaft of the vehicle up to the necessary speed for cruising operation of the vehicle while at the same time enabling each of the motors to operate at its optimum rate of speed. This arrangement, therefore, avoids excessive current drains on the batteries as occurs when a battery-powered motor is operated at other than its optimum or rated speed.

---

The present invention relates to electric powered automobiles, and more particularly to an improved battery-powered motor arrangement for operating an automobile or other such vehicle.

It is generally understood that an appropriate power source for normal operation of an automobile can be a twelve horsepower motor. Moreover, those seeking to replace the gasoline engine with an electric motor have invariably proposed the use of a single electric motor capable of delivering the aforementioned horsepower. This single twelve horsepower motor is, in turn, energized either by a specially built battery capable of delivering the necessary current to such a motor or by a series-connected bank of smaller batteries. The electric cars which are now known, however, have not proven to be practical primarily because of the need to frequently charge the battery. This, in turn, has led to considerable effort to improve the battery so as to prolong the interval of car use between charging. In accordance with the present invention, however, it is pointed out that improvement is not necessarily required in the batteries which are available today, but rather in the manner in which these batteries are used. Specifically, it is noted that by making more efficient use of the batteries which are commercially and readily available today that the interval of use of an electric motor car can be extended for a duration of time which makes battery operation of cars practical and highly desirable.

Broadly, it is an object of the present invention to provide a battery-powered motor arrangement, specifically for a vehicle, which overcomes the foregoing and other shortcomings of the prior art. Specifically, it is an object to provide a battery-powered motor arrangement which utilizes a number of small individual motors, each powered by a conventionally and readily available battery, and each of which is operated at its optimum operating speed during use, such as for example during the buildup of speed of the vehicle, that there is never any excessive and thus inefficient current drain imposed on the batteries which heretofore has resulted in the need for frequent charging thereof.

A battery-powered motor arrangement demonstrating objects and advantages of the present invention includes the plural motors, as just indicated, each energized by a battery which in a preferred embodiment does not exceed twenty-four volts, and each of which is operatively arranged to drive the power shaft in rotation via intermeshing gears. Specifically, the gears are of a selected tooth ratio so that the power shaft is progressively brought to the proper operating speeds by these motors which are always operated at their optimum rated revolutions per minute.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying diagrammatic plan view of a battery-powered motor arrangement demonstrating objects and advantages of the present invention.

The illustrated motor arrangement is intended for use in driving an automobile or other such vehicle and overcomes the major obstacles which have blocked this development and which are believed to be attributable to the use of a single, large motor, which is required to be energized by a single, large battery or a bank of batteries. That is, an essential part of the present invention is the recognition that the problems associated with electric cars resides to a significant extent on the insistance by those concerned with this technology on using a single twelve horsepower or other similarly rated motor to drive the car. The inertia which must be overcome in powering such a motor results in a significant current drain on the batteries, and also introduces other problems. Additionally, such a motor is not operated at its optimum speed during all phases of operation of the car, as for example at start-up of the car and subsequently during normal cruising operation of the car. By avoiding these and other problems, the motor arrangement of the present invention constitutes a practical and operable solution to the problem of providing an electric car.

The drawing diagrammatically illustrates an exemplary battery-powered arrangement according to the present invention.

Referring to the drawing, in a typical installation the motor arrangement includes a pair of facing support walls 10 and 12 in which there is appropriately journaled for rotation the motor shafts, individually and collectively designated 14, of a recommended number of eight motors 16–23. Since each of the motors are substantially the same, the description of motor 16 will suffice for all of them.

Motor 16 will be understood to be a conventional DC motor having a rated two horsepower capacity and designed to operate at 4,000 r.p.m. for maximum efficiency. This type of motor is readily commercially available and is produced by a number of motor manufacturers. In addition to its availability, motor 16 is also readily operated by a conventional, and thus also readily commercially available, twelve to twenty-four volt battery, also individually and collectively designated 24. Conductors 26, 28 electrically connect each battery 24 to its cooperating associated motor 16–23. Additionally, a cable 30 carrying a plurality of conductors is electrically connected between the batteries 24 and a conventional switching means 32 which, operating in a well understood manner, is effective to electrically complete or open various energizing circuits of the motor 16–23.

Switching means 32 will be understood to be appropriately operatively connected to and thus operated during the operation of the equivalent of the conventional "gasoline pedal" of the automobile such that during startup of the vehicle when the "pedal" is only slightly depressed, switching means 32 is effective in completing the energization circuits for the motors 16, 17. By continuing to depress the "pedal," the energization circuits for the motors 18 and 19 are next completed while the previous energization circuits for the motors 16 and 17 are opened and thus the operation of the motors 16 and 17 terminated. Finally, continued depressing of the automobile pedal such as was previously necessary to produce cruising operation of the automobile, will be understood to result in completion of the energization circuits for the four final motors 20–23 and, simultaneously, result in the opening of the energization circuits for the motors 18, 19, and thus the termination of operation of these motors.

The power or drive shaft of the automobile or vehicle is generally designated 34 in the drawing, and will be understood to be appropriately journaled for rotation in bearings 36 and 38 at a location intermediate and oriented lengthwise of the support walls 10, 12. At an appropriate location between the motor 16 and 17, as at location 40, there is appropriately mounted on the power shaft 34 a bevel gear 42 which is in meshing engagement with bevel gears 44, 46 of the motors 16, 17, respectively. It will be understood that the teeth ratio of the gear 42 and of the identical gears 44 and 46 are such that there is an eight-to-one ratio in speed between the speed of operation of the motors 16, 17 and the power shaft 34. That is, assuming that the motors 16, 17 operate at their rated speed of 4,000 r.p.m., the gear ratio of eight to one between the gears 44, 46 and the gear 42 of the shaft 24 is such that the shaft is powered in rotation at ⅛ the motor shaft speed or a speed of 500 r.p.m. As already noted, this occurs when the user of the vehicle starts to depress the "gasoline pedal" and the vehicle is started from a stationary position. At this time in the operation of the vehicle, of course, it is desirable that there be a development of high torque to overcome the inertia against movement of the vehicle. This is precisely what is provided by and is the function of the motors 16, 17.

Interconnected between the left-hand end length of the power shaft 34, specifically designated 34a, and the next length thereof designated 34b is an over-running clutch or coupling 45 which, in a well understood manner is effective in disconnecting the shaft length 34a from the shaft length 34b when the speed of 500 r.p.m. is reached. An acceptable over-running coupling which may be used is that produced by the Hilliard Corporation of Elmira, N.Y.

Fixedly connected to the right of the over-running clutch 45 is a second bevel gear 46 which is in meshing engagement with bevel gears 48, 50 of the motors 18, 19. Here again it will be understood that the number of teeth of the gears 48, 50 and of the gear 46 are such that there is a four-to-one ratio in the rotational speeds of the motors 18, 19 and of the power shaft segment 34b. That is, assuming that the motors 18, 19 are operating at their optimum speed of 4,000 r.p.m., the gear ratio of four to one produces a speed in the shaft segment 34b of approximately 1,000 r.p.m. Thus, the shaft segment 34b is increased in speed from 500 r.p.m., the speed provided by the motors 16, 17 to the next increment of speed which is preferably 1,000 r.p.m. Stated another way, the motors 18, 19 take over for the motors 16, 17.

Interconnecting the shaft length 34b to the next shaft length, specifically designated 34c, is a second over-running clutch 52 which is effective to disconnect the shaft length 34b from the shaft length 34c when the speed of 1,000 r.p.m. is reached.

Powering the shaft length or segment 34c in rotation are a group of four motors 20–23. The operative connection between these motors and the shaft consists of two bevel gears 54, 56 fixedly mounted on the shaft length 34c and each respectively in meshing engagement with the bevel gears 58, 60 of the motors 20 and 21 and with the bevel gears 62, 64 of the motors 22 and 23. The ratio of teeth of these gears will be understood to be such that a seven-to-eight speed ratio results or, in other words, for a motor shaft speed of 4,000 r.p.m. there will be a speed of rotation produced in the shaft segment 34c of ⅞ of this value or approximately 3,500 r.p.m. Moreover, when the power shaft 34c is operating at 3,500 r.p.m. it will be understood that the vehicle is traveling at a cruising speed of approximately 45 miles per hour or more.

From the foregoing it should be readily appreciated that there has been described herein a motor system which is powered exclusively on batteries and one which avoids all of the problems heretofore encountered and attributable to the use of a single, large battery-operated motor to drive a land vehicle. Specifically, by using the several motors 16–23, use can be made of individual batteries 24 which each do not exceed twenty-four volts. Such batteries are readily commercially available. More important, because of the use of plural motors, it is possible to mechanically connect these motors to drive or power the power shaft 34 in rotation through meshing gears which have selective numbers of teeth to provide the necessary speed ratios so that the motors are always operated at their optimum speed while the power shaft is progressively brought to the proper rotational speed to provide the necessary cruising speed for the vehicle. In so doing, there is avoided excessive current drain on the batteries which is in sharp contrast to the prior art technique which uses a single motor to drive the car and in which the current drain is excessive at startup of the vehicle and constitutes an extremely inefficient use of the battery at this time. Also, the batteries of the motors not in actual use can be charged during such non-use, such charging possibly being achieved by a generator powered by a small gasoline operated motor.

A latitude of modification, change and substitution is intended in the foregoing disclosure and in some instances some features of the invention will be employed without a corresponding use of other features.

What is claimed is:

1. A battery-powered motor arrangement comprising a power shaft, and plural motors, each having an optimum operating speed and energized by a battery, operatively arranged to power said power shaft in rotation, said operative arrangement including intermeshing gears of selected tooth ratios connected between said motors and said power shaft so as to progressively increase said rotational speed of said power shaft while each said motor operates substantially at its said optimum operating speed, whereby the current drain by each said motor on its said cooperating battery is advantageously minimized.

2. A battery-powered motor arrangement as defined in claim 1 wherein each said motor is preferably of a two horsepower rated capacity and is energized by a battery not substantially exceeding twenty-four volts.

3. A battery-powered motor arrangement as defined in claim 2 wherein said power shaft includes clutch means interconnecting the lengths thereof effective to progressively disengage selected shaft lengths and those of said motors operatively connected thereto during the progressive speed buildup of said power shaft.

4. A battery-powered motor arrangement comprising a power shaft, plural motors, each having an optmium operating speed and energized by at least one battery, operatively arranged to power said power shaft in rotation, said operative arrangement including an intermeshing driving connection of selective driving tooth ratios connected between said motors and said power shaft so as to progressively increase said rotational speed of said power shaft while each said motor operates substantially at its said optimum operating speed, whereby the current drain by each said motor on its said cooperating battery is advantageously minimized.

References Cited

UNITED STATES PATENTS

| | | | |
|---|---|---|---|
| 3,056,314 | 10/1962 | Eichler et al. | 74—661X |
| 3,161,083 | 12/1964 | Roe | 74—661X |
| 3,214,998 | 11/1965 | Hall | 74—661 |
| 3,487,721 | 1/1970 | Burkhardt et al. | 74—661 |

LEONARD H. GERIN, Primary Examiner

U.S. Cl. X.R.

74—417